3,401,105
PHOTOCHEMICAL PROCESS FOR PREPARING
α,β-DICHLOROPROPIONITRILE
Tom Anyos and Wendell W. Moyer, Jr., Parkersburg,
W. Va., assignors to Borg-Warner Corporation, Chicago, Ill., a corporation of Illinois
No Drawing. Filed Aug. 27, 1965, Ser. No. 483,328
6 Claims. (Cl. 204—158)

This invention relates to the production of α,β-dichloropropionitrile and more particularly to a method for the preparation of a compound represented by the formula

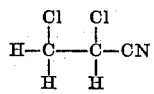

α,β-Dichloropropionitrile is a very desirable commercial product and has particular value as an intermediate for the production of other compounds including α-chloroacrylonitrile. Many methods of preparing α,β-dichloropropionitrile were suggested prior to this invention. Some of the more common methods were the reaction of chlorine with acrylonitrile in a pyridine solution, bulk chlorination of acrylonitrile catalyzed by light, the light catalyzed chlorination of acrylonitrile in organic solvents such as carbon tetrachloride, and direct chlorination of acrylonitrile in an aqueous medium.

Perhaps the most efficient method of preparing α,β-dichloropropionitrile prior to this invention was by solution photochlorination (solutions of carbon tetrachloride).

All of the aforementioned methods were somewhat limited by their inability to prepare α,β-dichloropropionitrile in high yields, i.e., above 70 percent at 100 percent conversion. Also, all of the prior methods of preparing α,β-dichloropropionitrile had a tendency to form undesirable by-products such as α,α,β-trichloropropionitrile, β-chloropropionitrile, and oligomers of the structure

The present invention is directed to a method of making α,β-dichloropropionitrile by bulk photochlorination at high conversions wherein the formation of by-products is avoided and α,β-dichloropropionitrile yields are obtained in the area of 96+ percent. Generally stated, it is the bulk photochlorination of acrylonitrile in the presence of proportionately high chlorine concentrations and a weakly basic acid acceptor.

In the bulk photochlorination reaction of this invention, chlorine gas may be vented directly from a cylinder containing the compressed liquid, through a flow meter into a column or flask containing liquid acrylonitrile. The liquid acrylonitrile and chlorine are reacted in the presence of light which acts as a catalyst. The reaction may be accomplished either by reacting very rapidly small stoichiometric quantities to 100 percent conversion and placing the product in the presence of a weakly basic acid acceptor before acid induced side reactions occur, or the reaction may be run in the presence of the acid acceptor while maintaining a high unreacted chlorine concentration throughout the reaction. By high concentration, it is meant close to an equimolar amount of chlorine. It is essential that there be free unreacted chlorine present during the reaction, however, there is no indication that a molar excess is required. The high chlorine concentration inhibits the formation of telomeric by-products while the weakly basic acid acceptor stabilizes the formed α,β-dichloropropionitrile and thereby inhibits the formation of monomeric by-products.

The acid acceptor that may be added is weakly basic, as mentioned, and any acid acceptor which has a pH range in water of between about 6 and about 9 may be utilized. Acid acceptors, such as disodium hydrogen phosphate or sodium acetate have been found to be effective. When the reaction takes place in a column or flask, either in or out of the presence of an acid acceptor, the reactants within the column or flask are illuminated with visible light from a Mazda lamp or ultraviolet from a standard sun lamp. If the product is formed out of the presence of the acid acceptor, the weakly basic acid acceptor is added immediately thereafter to stabilize the product and prevent formation of monomeric by-products.

The wave length of light utilized to catalyze the reaction may fall within a range of from about 250 to about 750 millimicrons. The wave length of the light is most effective in the range of the ultraviolet light, however, the reaction will proceed if the light is within the range of 250–750 millimicrons. The most active range of light is from about 250–300 millimicrons.

The rate of chlorine flow (chlorine concentration) is a critical factor in the reaction, irrespective of the order of addition of the acid acceptor, and it has been found that the higher the chlorine concentration, i.e., up to and exceeding stoichiometric quantities, the higher the yield of α,β-dichloropropionitrile and proportionately, the lower the telomeric by-product yield. It should be noted that higher yields are obtained as the temperature of the reaction is decreased. This result is explained by the increase in chlorine concentration at lower temperatures. Thus, the chlorine concentration can be increased either by lowering the temperature or by increasing the pressure under which the reaction takes place.

The following examples illustrate the preparation of α,β-dichloropropionitrile using a bulk or column chlorination reaction as described hereinabove.

EXAMPLE 1

Bulk photochlorination of acrylonitrile 955 g. (18 moles) of acrylonitrile and 162 g. (1.13 moles) disodium hydrogen phosphate were added to a 2000 ml. three-necked flask equipped with a stirrer, cold bath, chlorine inlet tube, thermometer, reflux condenser and Dry Ice/acetone trap. 1280 g. (18 moles) of chlorine were added at the rate of 190 g. per hour. The reaction was continuously stirred at a controlled temperature of 15° C. The flask was irradiated with two 200 watt incandescent lamps. At the end of 6½ hours, the reaction was stopped. There was a yield of 85 percent α,β-dichloropropionitrile.

EXAMPLE 2

Bulk photochlorination of acrylonitrile

Utilizing the same reactants, the reaction of Example 1 was run at 0° C., and the yield was approximately 95 percent, α,β-dichloropropionitrile.

EXAMPLE 3

Bulk photochlorination of acrylonitrile

Utilizing the same apparatus as in Example 1, 106 g. (2 moles) of acrylonitrile and 15 g. (0.11 mole) of disodium hydrogen phosphate were charged to the reaction flask. The flask was irradiated with two 200 watt incandescent lamps. The reaction flask was cooled to −70° C. with Dry Ice/acetone. 142 g. (2 moles) of chlorine were added over a two hour period. The yield of α,β-dichloropropionitrile was 99 percent.

EXAMPLE 4

Column photochlorination of acrylonitrile 954 g. (18 moles) of acrylonitrile were charged into a water-cooled column 15 inches in length, 2 inches inner diameter, packed with ⅛″ glass helices and equipped with a Dry Ice/acetone condenser. The column emptied into a 2 liter receiver flask containing disodium hydrogen phosphate. During the addition of the reactants, the column was irradiated with three 200 watt incandescent light bulbs. A steady flow of chlorine gas was maintained at optimum rate by gas chromatographic analysis of the column effluent. The product yield was 98–99 percent α,β-dichloropropionitrile.

It will be noted from the above examples that the method of this invention provides a means of obtaining extremely high yields of α,β-dichloropropionitrile without interference of side reactions, i.e., formation of monomeric and telomeric by-products. Though the examples were not run at high pressure but instead at reduced temperature, it will be understood that either higher pressure or reduced temperature will increase the chlorine concentration and in turn will bring about higher yields of α,β-dichloropropionitrile.

While a preferred embodiment of the invention has been described above, it will be apparent to those skilled in the art that various changes and modifications may be made without departing from the spirit of the invention. The scope of the invention is defined solely by the appended claims which should be construed as broadly as is consistent with the prior art.

What is claimed is:

1. A method of making α,β-dichloropropionitrile which comprises reacting a high concentration of chlorine with acrylonitrile in the presence of light and in contact with a weakly basic acid acceptor.

2. A method of making α,β-dichloropropionitrile which comprises reacting acrylonitrile with chlorine in the presence of light while maintaining high chlorine concentrations and thereafter contacting the product obtained by this reaction with a weakly basic acid acceptor.

3. A method of making α,β-dichloropropionitrile which comprises reacting an equimolar amount of chlorine with acrylonitrile in the presence of an acid acceptor and light, said acid acceptor characterized by having a pH range of 6 to 9 in aqueous solution and said light characterized by falling within a wave length range of from about 250 to about 750 millimicrons.

4. A method of making α,β-dichloropropionitrile which comprises reacting up to an equimolar amount of chlorine with acrylonitrile at a temperature of between about −70° C. and 23° C. in the presence of an acid acceptor and light, to thereby obtain a yield of α,β-dichloropropionitrile in excess of 95 percent of theoretical yield.

5. A method of making α,β-dichloropropionitrile which comprises reacting at least an equimolar amount of chlorine with acrylonitrile at a temperature of between about −70° C. and 23° C. in the presence of an acid acceptor and light, to thereby obtain a yield of α,β-dichloropropionitrile in excess of 95 percent of theoretical yield.

6. A method of making α,β-dichloropropionitrile which comprises reacting a molar excess of chlorine with acrylonitrile at a temperature of between about −70° C. and 23° C. in the presence of an acid aceceptor selected from the group consisting of disodium hydrogen phosphate and sodium acetate and light, to thereby obtain a yield of α,β-dichloropropionitrile in excess of 95 percent of theoretical yield.

References Cited

UNITED STATES PATENTS

| 2,390,470 | 12/1945 | Summer | 204—158 |
| 3,161,577 | 12/1964 | D'Errico | 204—158 |

FOREIGN PATENTS

| 522,835 | 6/1940 | Great Britain. |

HOWARD S. WILLIAMS, *Primary Examiner.*